May 14, 1963 W. E. STILLINGS 3,089,988
SLEWING MOTOR SERVOSYSTEM WITH NULL SENSING RELAY CIRCUIT
Filed June 29, 1960 2 Sheets-Sheet 1

INVENTOR
WARNER E. STILLINGS

United States Patent Office 3,089,988
Patented May 14, 1963

3,089,988
SLEWING MOTOR SERVO SYSTEM WITH NULL SENSING RELAY CIRCUIT
Warner E. Stillings, Endicott, N.Y., assignor to International Business Machines Corporation, New York, N.Y., a corporation of New York
Filed June 29, 1960, Ser. No. 39,585
11 Claims. (Cl. 318—19)

This invention relates in general to a servo system, and more particularly to a Zener diode circuit for sensing an approaching null point of the signal from a servo amplifier in order to disconnect a slew motor from the output load.

A servo system is often defined as a power amplifying system used for the automatic control or movement of an output load, usually a rotated shaft, in agreement with the value of a positioning signal. Any difference between the position of the output shaft that is indicated by the positioning signal causes an error signal to be generated which allows torque to be applied to the output shaft in a direction that tends to correct (or reduce) the position difference and so drive the error signal to a null value. The torque so applied to the output shaft is generated by a servo motor which is responsive to the error signal for moving the shaft in the prescribed direction. In many cases, the ideal performance of a servo system requires that upon the output shaft reaching the desired position, its motion should cease immediately without there being a tendency to overshoot. The elimination of such tendencies may be effectively accomplished by limiting the amount of torque supplied by the servo motor so that the output shaft cannot change position rapidly, especially as it approaches the desired position, in order that it can be abruptly stopped. This function of the servo motor is often known in the art as "tracking." However, in some servo systems, the desired position of an output shaft may be relatively distant from its actual position at the time that the positioning signal is applied. The system might then be required to perform the so-called "slewing" function which is defined as the rapid swing or movement of the output shaft in the prescribed direction toward the desired position. However, as the shaft approaches the desired position, the speed should be substantially reduced so as to prevent the problem of overshoot as previously described. The provision of the slewing function thus substantially decreases the time needed for the output shaft to be placed on target, yet avoids the undesirable problem of overshoot.

The performances required of a torque generator during the slewing time and the tracking time are very often incompatible with each other when attempting to use but one servo motor for both functions. The prior art has therefore made use of a separate slew motor which is designed to rapidly move the output shaft in the required direction until the desired position is almost reached, after which a regular servo motor provides the tracking function to exactly position the output shaft. Both the servo motor and the slew motor are normally coupled to the output shaft by means of a mechanical differential which acts in the well known fashion to transmit torque from either motor to the output shaft.

The function of connecting and disconnecting a slew motor into a servo system sometimes devolves upon a relay or other switch which is sensitive to a particular condition of the error signal. In such servo systems, the error signal voltage magnitude is proportional to difference between the desired and actual positions of the output shaft. Therefore, for a relatively large error voltage magnitude, it follows that the output shaft is not substantially near the desired position and so may be rapidly moved.

In the prior art, therefore, upon the output approaching the desired position, the error voltage magnitude also approaches a null value so as to de-energize the relay controlling the operation of the slew motor. However, with most relays, the picking voltage and the drop-out voltage of their coils vary, with the pick voltage being substantially higher than the drop-out voltage. Furthermore, the drop-out voltage of a relay does not necessarily remain at a constant magnitude, but may only fall within a particular range. Normally, too, relays used for this function in servo systems have a fairly small drop-out voltage so that they do not become de-energized until the output shaft is driven very close to its desired position. In such a case, the drop-out time of the relay contacts, after the drop-out voltage is reached, will very often be great enough so that the slew motor is not actually disconnected from the servo system in time to prevent overshoot. This is more true in cases where the speed of the slew motor is quite high and the output shaft is very rapidly driven toward the desired position. It would be more desirable to de-energize the control relay by an error voltage magnitude which is substantially greater than the normal drop-out voltage of that relay, in order to insure that the relay will switch in time to prevent the slew motor from exercising any control over the driven output shaft in such a way that an overshoot occurs.

It is therefore an object of this invention to provide a sensing circuit for the error signal from a servo amplifier which prematurely senses the driving of the error voltage to its null point in order to effect a control operation.

Another object of the present invention is to provide an amplifier sensing circuit utilizing a Zener diode in order to exactly define the drop-out point of a relay which performs control functions.

A yet further object of the present invention is to provide a servo system having a slew motor which is connected in circuit by means of a control relay initially energized by an independent operating pulse, with said relay thereafter being controlled by the magnitude of the error voltage from a servo amplifier so that said slew motor will be disconnected from the servo system at a time early enough to prevent overshoot.

A further object of the present invention is to provide a null sensing circuit include a Zener diode which is utilized to raise the drop-out voltage characteristic of a control relay, and for preventing damage to said relay by virtue of a large signal applied across the circuit.

Other and further objects of the invention will become apparent during the description of the invention in the following specification, when taken with the accompanying drawings, in which.

Figure 1:
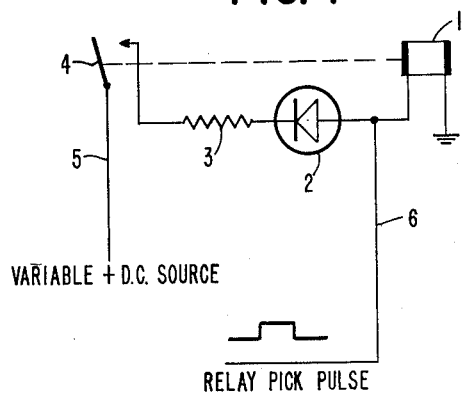
FIGURE 1 shows the basic Zener diode sensing circuit.

FIGURE 1 shows the novel sensing circuit of the present invention. Relay 1 is connected in series with a Zener diode 2 and a resistor 3 between the ground point and a contact of switch 4 which is closed by the energization of relay 1. Switch 4 is further connected to a source of variable D.C. voltage having a positive polarity. A conductor 6 is also connected to the ungrounded terminal of relay 1, upon which appears a relay pick pulse whose function will be subsequently described.

A Zener diode is constructed of semiconductor material, such as germanium or silicon, having two adjacent regions of opposite type conductivity which form a rectifying junction therebetween. In semiconductor parlance, one region may be of N-type semiconductor material, while the other is of P-type material. When the P-region, or anode, is biased positive with respect to the N-region, or cathode, very little resistance is offered by the diode to current flow therethrough and only a very small voltage drop across the diode is produced. The diode is said now to be in its forward biased condition. However, upon reversing the polarity of the bias to the diode, i.e., making the N-region cathode more positive than the P-region anode, an extremely high resistance is presented by the diode to current flow therethrough so that the diode essentially acts as an open circuit. This high resistance characteristic prevails until the reverse bias on the diode approaches a designed critical breakdown magnitude. Upon reaching this critical magnitude, Zener breakdown across the junction occurs which immediately allows increased current flow thereacross. Zener breakdown has been defined as the condition in which the electric field across the barrier region is sufficiently high enough to cause a kind of field emission across the energy gap, thus increasing the number of carriers in this region by a large amount. In the breakdown condition, the voltage across the Zener diode remains at the same value as the critical breakdown voltage, although current therethrough can increase.

In FIGURE 1, it can now be seen that Zener diode 2 is so connected in circuit that it would be reverse biased by application of the variable D.C. voltage source across a closed switch 4. For purposes of the present discussion and in the present embodiment of the invention, the pick voltage applied across relay 1 which is required to energize is taken to be approximately twelve volts. The relay, when picked, will remain energized for voltages across its terminals greater than five volts. This is a typical spread of the pick and drop-out voltages of a relay normally used in servo systems forming the environment of the present invention. A typical coil resistance for such a relay is 600 ohms. Furthermore, it is also assumed that the magnitude of the D.C. voltage varies between 0 and 50 volts, and that the magnitude of the pick pulse on conductor 6 is sufficiently great to energize relay 1. The breakdown potential of Zener diode 2 is considered to be 24 volts in the present embodiment, and the value of resistor 3 is approximately 1200 ohms.

Figure 2:
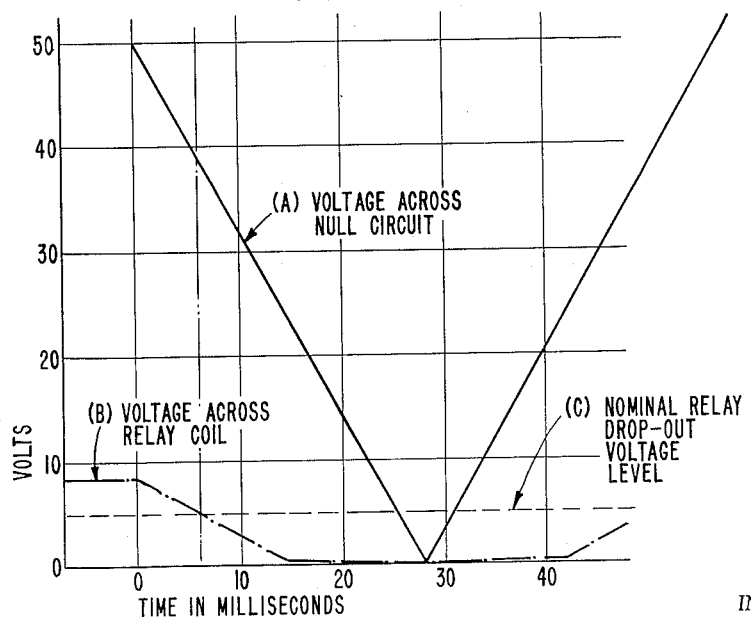
FIGURE 2 shows the voltage characteristics of the sensing circuit of FIGURE 1.

Referring now to FIGURE 2, the operation of FIGURE 1 will be explained. Initially, relay 1 is not energized and switch 4 is thus open so as to prevent the D.C. voltage from being applied across the series circuit. Normally, the relay pick pulse on conductor 6 will be generated when the magnitude of the D.C. voltage is sufficiently great so as to maintain energization of the relay when switch 4 closes. Assuming now that the D.C. voltage is at its maximum of 50 volts, the pick pulse is applied and energizes relay 1 so as to close switch 4. With a value of 50 volts applied across the series circuit, Zener diode 2 immediately begins to conduct since its breakdown potential is only 24 volts. The voltage across relay 1 during diode breakdown is given by the following equation:

Relay holding voltage
= (D. C. voltage − Zener breakdown voltage)
$$\times \frac{\text{Relay coil resistance}}{\text{Relay coil resistance} + \text{other resistance}}$$

Using the assumed relay coil resistance value of 600 ohms and 1200 ohms for resistor 3, the above equation may be written as follows:

Relay holding voltage $= (50-24) \times \frac{600}{600+1200}$ $$= 26 \times \frac{1}{3} = 8.67 \text{ v.}$$

Thus, the eight-volt potential across relay 1 is more than sufficient to maintain it in the energized condition upon cessation of the relay pick pulse on conductor 6. In FIGURE 2, the voltage at zero time across the series circuit is therefore indicated by the solid line A which is at the 50-volt potential. The voltage across relay coil is indicated by the dot-dash line B which is approximately nine volts. If now the D.C. source is decreased in magnitude at the rate indicated in FIGURE 2, the decrease in the relay holding voltage is at a lesser rate since the 24-volt drop across Zener diode 2 is maintained. As beforementioned, relay 1 must have a five-volt minimum potential thereacross in order to maintain energization. As shown in FIGURE 2, the dot-dash line B eventually intersects the dotted line C which indicates the nominal relay drop-out voltage level of five volts. At this time, the D.C. voltage across the complete series circuit is approximately 39 volts. Although the drop-out voltage has now been reached, the drop-out of switch 4 is not instantaneous, but it may continue to be closed for a substantial period of time as measured in milliseconds. Therefore, the ever-decreasing D.C. voltage across the series circuit continues to be applied across Zener diode 2 unit it falls below a value of 24 volts. At this time, breakdown across Zener diode 2 ceases and effectively open-circuits the series circuit so as to allow little or no current to flow therethrough. Some time after the variable D.C. source has been reduced below the Zener diode breakdown voltage, switch 4 may open. The D.C. voltage eventually reaches its null value of zero volts, after which it can rise again. Relay 1 cannot be energized, however, until another pick pulse on conductor 6 appears.

From the above description it should be appreciated that if Zener diode 2 were missing from the circuit shown in FIGURE 1, then relay 1 would not begin to drop-out until the D.C. voltage across the circuit had been reduced to approximately 15 volts. If this were the case, contact 4 may not have opened until after the D.C. voltage had been reduced to zero, since it is noted that drop-out time may be greater than eight milliseconds, whereas the time taken for the D.C. voltage to go from 15 volts to zero volts is approximately equal to eight milliseconds. The use of the Zener diode, however, causes the drop-out voltage across relay 1 to be prematurely reached so that switch 4 and other contacts associated with relay 1 will have completed their transfers prior to the time that the D.C. voltage reaches its null value. Thus, if other contacts of relay 1 were used to control a slew motor in a servo system, it can be seen that the circuit of FIGURE 1 would allow such a slew motor to be disconnected before the null point value of an error signal is reached. It is further to be noted that breakdown potential of a Zener diode is relatively stable and so accurately fixes the D.C. potential at which the relay becomes de-energized. Also, large currents cannot flow through the relay coil in the event that the D.C. voltage becomes excessively large so that the Zener diode provides a protective feature.

It should also be noted that in FIGURE 2, the relay pick pulse must be used in order to initially energize relay 1, since the D.C. voltage is applied to the circuit via switch 4 which itself is closed only when relay 1 is energized. This is necessary in the present embodiment because the maximum value of the D.C. source is 50 volts which results in a maximum of eight volts across relay coil 1. However, as previously mentioned, the pick voltage is approximately twelve volts, which is not obtainable across the relay coil 1. Of course, if the D.C. voltage across the series circuit is great enough to provide, upon breakdown of the Zener diode, the picking voltage needed for relay 1, then the relay pick pulse on conductor 6 might be dispensed with if switch 4 were replaced with a short circuit. In the present embodiment, however, the relay pick pulse also serves another function related to the over-all system environment which does not form a part of the present invention. Thus, there may be times during which no picking of relay 1 is desired, even though the D.C. voltage might have sufficient magnitude. It should further be noted that the duration of the pick pulse should be great enough to maintain relay 1 energized until switch 4 has closed. Another point to remember is that resistor 3 is not required for the purposes of the present invention. Its presence in the circuit does, however, limit current flow therethrough and lowers the value of the D.C. voltage required to permit drop-out.

Figure 3:
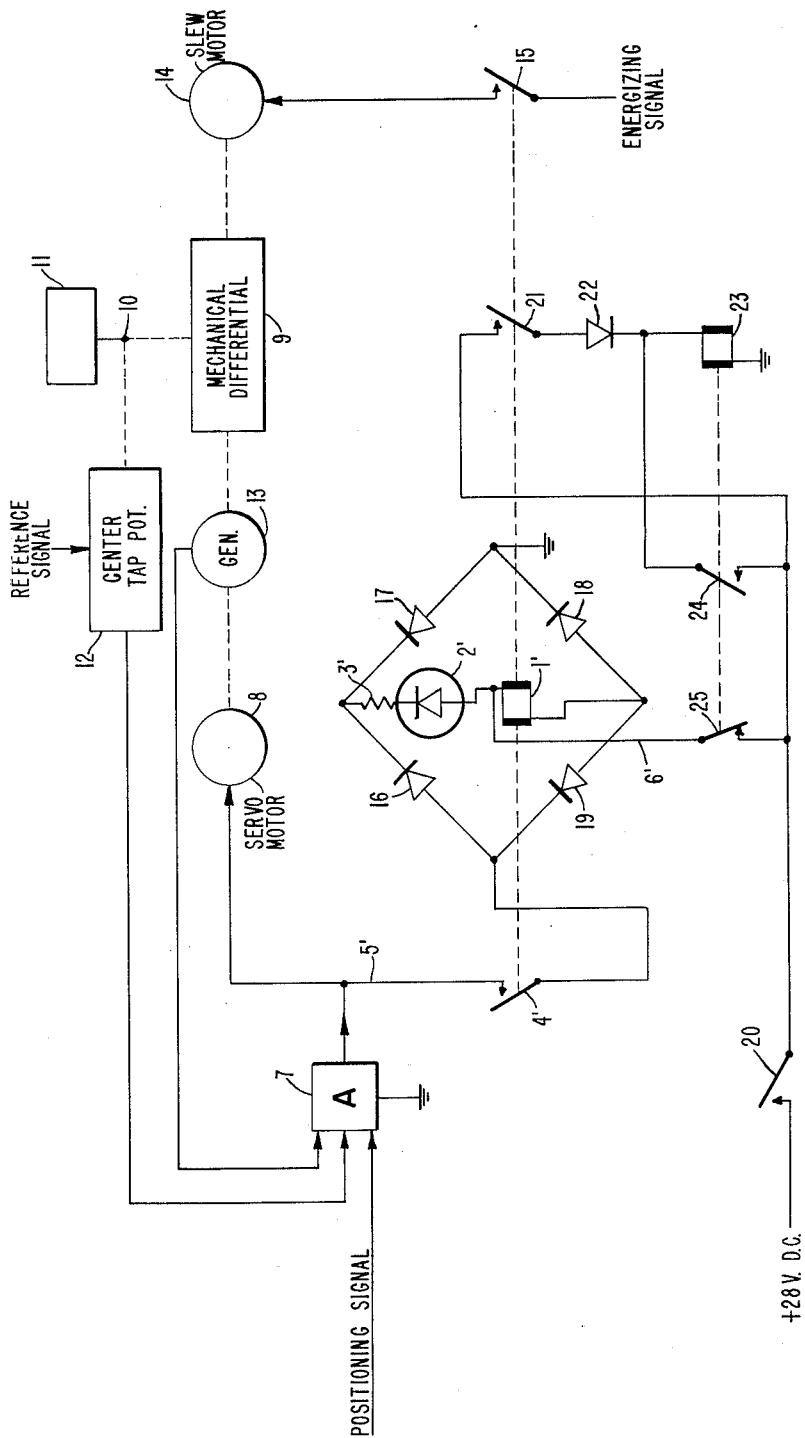
FIGURE 3 discloses the novel sensing circuit in a novel servo system containing a slew motor.

Turning now to FIGURE 3, the practical application of the null sensing circuit of FIGURE 1 will be explained with respect to a novel servo system in which the amplifier circuit controls the operation of a slew motor for rapidly reducing an error signal caused by the displacement of an output shaft from a desired position. Elements in FIGURE 3 corresponding to those in FIGURE 1 are indicated by the primed numbers. An output shaft 10 drives a load 11 to any of a number of positions in accordance with a positioning signal appearing at one of the inputs to a servo amplifier 7. It is, of course, to be understood that a rotating shaft is but one example of a mechanism controlled by a servo system. The motion could be linear as well as angular, or a combination of these directions. Normally, to accurately position the output shaft without overshoot, a servo motor 8 is utilized which is mechanically coupled to shaft 10 by means of a mechanical differential 9 constructed according to well known principles. In order to rapidly move the shaft 10 toward its desired position in the event that it is substantially displaced away from said position, a slew motor 14 is also coupled via mechanical differential 9 to shaft 10. Slew motor 14 may only be energized upon the closing of switch 15 which is controlled by relay 1'. The direction of rotation of slew motor 14 is determined by the nature (usually polarity or phase) of the energizing signal applied via switch 15, which in turn may be generated by many well known techniques in the art.

In order to determine the actual position of shaft 10, it may be mechanically coupled to a potentiometer 12 which consists of an energized center tapped winding or resistance. A wiper arm is associated so as to sweep the winding or resistance element which itself is energized by a reference signal. When shaft 10 is in a particular reference position, the wiper arm may be in contact with the center tap so that its output essentially is of zero magnitude. This output is also fed to one input of amplifier 7. If the shaft 10 is not at its particular reference point, then a signal will be generated from the potentiometer via the wiper arm whose amplitude and phase/polarity is indicative of the exact angular position of shaft 10. The input positioning signal to amplifier 7 is indicative of the desired position whereupon it will completely cancel out the signal from potentiometer 12 only if the desired position corresponds to the actual position of shaft 10. Therefore, in mixing these two input signals, amplifier 7 generates a signal of some magnitude and phase/polarity which indicates that shaft 10 must be displaced in order to reach the desired position. This error signal may then be used to energize and control the direction of rotation of servo motor 8 in order to drive shaft 10 so as to eventually reduce the error signal to its null value when the signal from potentiometer 12 is such that it will cancel out the positioning signal input.

The voltage from generator 13, which is also mechanically coupled to the servo motor shaft, is merely used as a damping voltage so as to definitely prevent any overshoot as the result of servo motor action. This voltage is also applied to amplifier 7, but is not essential to the present invention. The positioning signal and reference signal may be either A.C. or D.C., and motors 8 and 14 may also be either A.C. or D.C. The error signal output from amplifier 7 consequently may be either of positive or negative polarity if D.C., or may be an A.C. voltage whose relative phase may vary by 180°. The phase or polarity characteristics of the error voltage will indicate the direction in which the shaft 10 is to be moved in order to reduce the error voltage, while the magnitude of the error signal normally is proportional to the distance that shaft 10 must be moved in order to reach the desired position. Any saturation occurring in servo amplifier 7 may be neglected for purposes of the present discussion.

The null sensing circuit of FIGURE 1 is shown in FIGURE 3 as comprising relay 1', Zener diode 2', and resistor 3'. Furthermore, since the error signal from amplifier 7 may be either a positive or negative polarity at different times, a rectifier must be used in order to insure that Zener diode 2' is reverse biased at all times by the error signal. In the embodiment of FIGURE 3, this rectifier takes the form of a bridge comprised of diodes 16, 17, 18, and 19 arranged in well known fashion. Thus, when the magnitude of the error signal is positive with respect to ground, diodes 16 and 18 will be forward biased so as to maintain Zener diode 2' in a reverse biased condition and to allow current to flow through relay 1' only in the "down" direction upon breakdown of the Zener diode. Conversely, when the error signal is negative with respect to ground, diodes 17 and 19 are forward biased so as to again insure that current flow through relay 1' is in the "down" direction when Zener diode 2' is broken down. Obviously, other forms of rectifiers may be utilized. The only criterion is to prevent relay chatter, and in the present embodiment the error signal frequency, if A.C., is considered to be sufficiently great so that no filtering of the rectified voltage is deemed necessary. Thus, in FIGURE 2, the solid line A may also be taken to indicate R.M.S. value if the error voltage is A.C.

As previously described, the maximum voltage expected to be produced by amplifier 7 is not sufficiently great to allow the picking of relay 1', even in the event that switch 4' were replaced by a short circuit. Upon the selective closing of switch 20 by either manual or automatic means, a pick voltage may be applied from a D.C. source via switch 20 and normally closed switch 25, which is of sufficient magnitude to allow relay 1' to be energized, thus closing switch 4'. If at this time the error signal magnitude is great enough to cause breakdown of Zener diode 2' and to also apply at least the minimum holding voltage across the coil of relay 1', this relay will remain energized until the error signal reduces to such a degree that the relay drop-out voltage is reached. As further shown in FIGURE 3, it is desirous that the duration of the pick voltage via conductor 6' be as short as possible consistent with its function to initially energize relay 1' until switch 4' closes. Therefore, relay 23 is provided to open switch 25 as soon as relay 1' has been energized. This is accomplished by an additional switch 21 associated with relay 1' which closes so as to energize relay 23. Relay 23 is thereafter held through its closed switch 24 by means of the D.C. voltage across closed switch 20. At the same time, switch 25 of relay 23 is opened so as to isolate relay 1' from the effects of the D.C. voltage which exists across switch 20 as long as that switch remains closed. Relay 23 further remains energized through its hold switch 24 as long as the pick voltage from switch 20 remains in force. Relay 1' therefore is responsive only to the error signal from amplifier 7 after switch 4' is closed.

Switch 15 is also closed by the picking of relay 1' so as to apply the energizing signal to slew motor 14, with the nature of the energizing signal being such as to cause slew motor 14 to move shaft 10 in the proper direction so as to reduce the error voltage. However, upon the decrease of the error voltage to a value of approximately 39 volts, the drop-out potential of 5 volts occurs across relay 1' which results in the opening of switch 15 in time to de-energize slew motor 14 before the desired position of shaft 10 is reached. In such a case, the slower acting servo motor is the only torque producer to remain in circuit and it is designed to provide the tracking function which eventually drives shaft 10 to the desired position without overshoot occurring. As has been noted previously, without the insertion of Zener diode 2' in the null sensing circuit, the normal drop-out time of the switch 15, when once the drop-out voltage of relay 1' has been reached, might occur too late to prevent the slew motor from driving shaft 10 through its desired position.

Although a novel amplifier null sensing circuit has been shown and described, together with a novel servo system utilizing this circuit, it is apparent that a device of this nature is readily adaptable to a range of application not to be limited to servo systems of the type indicated. While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A servo system comprising means movable to a number of positions, means responsive to the actual position of said movable means and a desired position for said movable means for generating an error signal of variable magnitude, first torque producing means responsive to said error signal for moving said movable means, a Zener diode connected to be broken down by a certain magnitude range of said error signal, switch means responsive to said error signal only when said Zener diode is broken down, and second torque producing means responsive to the operation of said switch means for moving said movable means.

2. A servo system comprising means movable to a number of positions, energizable means for moving said movable means, means responsive to different positions of said movable means for generating an error signal of variable magnitude, a Zener diode operatively connected to be reverse biased by said error signal, said Zener diode being broken down in a certain magnitude range of said error signal, and switch means responsive to said error signal only when said Zener diode is broken down.

3. A servo system according to claim 2 in which said switch means is in series circuit with said Zener diode.

4. A servo system according to claim 3 further comprising a bridge rectifying circuit having one pair of opposite terminals connected to receive said error signal, its other pair of opposite terminals being connected across said series circuit.

5. A servo system comprising means movable to a number of positions, energizable means for moving said movable means, means including a Zener diode for energizing said moving means, means responsive to different positions of said movable means for generating an error signal of variable magnitude, said Zener diode being operatively connected in said energizing means so that it is reverse biased by said error signal, said Zener diode being broken down in a certain magnitude range of said error signal, means for producing an operating signal, means for selectively connecting said energizing means to receive said operating signal in order to initiate the energization of said moving means, and means for thereafter connecting said energizing means to receive said error signal.

6. A servo system according to claim 5 in which said energizing means upon operation is disconnected from said operating signal.

7. A servo system according to claim 5 in which said energizing means is responsive only to a predetermined magnitude range of said error signal for maintaining the energization of said moving means.

8. A servo system according to claim 5 in which said energizing means further includes switch means responsive to said error signal only when said Zener diode is broken down.

9. A servo system according to claim 8 in which said switch means is also responsive to said operating signal.

10. A servo system according to claim 8 further comprising means connecting said Zener diode and said switch means in series circuit.

11. A sensing circuit for determining the approach of a variable magnitude signal toward a null value comprising a Zener diode connected so as to be reverse biased by said variable signal, said Zener diode being broken down in a certain magnitude range of said variable signal, switch means responsive to said variable signal only when said Zener diode is broken down, said switch means including a relay coil and switch contacts, said relay coil being connected in series with said Zener diode, said contacts being connected in series between said variable signal and said Zener diode, and means to apply a pick pulse to said coil to close said contacts so that said variable signal energizes said coil once the Zener diode is broken down, thereby maintaining said contacts closed until said Zener diode is no longer broken down.

References Cited in the file of this patent

UNITED STATES PATENTS

| | | |
|---|---|---|
| 2,455,364 | Hays | Dec. 7, 1948 |
| 2,478,203 | McCoy | Aug. 9, 1949 |
| 2,798,992 | Adler et al. | July 9, 1957 |